(12) United States Patent
Lacroix et al.

(10) Patent No.: US 9,213,369 B2
(45) Date of Patent: Dec. 15, 2015

(54) POWER SUPPLY BASE FOR ELECTRONIC PAYMENT TERMINAL AND ELECTRONIC PAYMENT TERMINAL

(75) Inventors: Pierre Lacroix, Montauban (FR); Fabrice Fleury, Toulaud (FR); Sylvain Barneron, Bourg-lès-Valence (FR); Olivier Yernaux, Laudun L'Ardoise (FR); Eric Bonnet, Malissard (FR)

(73) Assignee: INGENICO GROUP, Paris (FR)

( * ) Notice: Subject to any disclaimer, the term of this patent is extended or adjusted under 35 U.S.C. 154(b) by 223 days.

(21) Appl. No.: 13/992,360

(22) PCT Filed: Dec. 7, 2011

(86) PCT No.: PCT/EP2011/072003
§ 371 (c)(1),
(2), (4) Date: Sep. 24, 2013

(87) PCT Pub. No.: WO2012/076569
PCT Pub. Date: Jun. 14, 2012

(65) Prior Publication Data
US 2014/0321047 A1    Oct. 30, 2014

(30) Foreign Application Priority Data

Dec. 7, 2010   (FR) ...................................... 10 60204
Dec. 7, 2010   (FR) ...................................... 10 60206

(51) Int. Cl.
*H02J 7/00*       (2006.01)
*G06F 1/16*       (2006.01)
*H04M 1/04*       (2006.01)

(52) U.S. Cl.
CPC ............. *G06F 1/1632* (2013.01); *H02J 7/0044* (2013.01); *H04M 1/04* (2013.01); *H04M 2250/14* (2013.01)

(58) Field of Classification Search
CPC ..................................... H02J 7/00; G07F 7/08
USPC ...................................................... 361/679.41
See application file for complete search history.

(56) References Cited

U.S. PATENT DOCUMENTS

| 5,109,540 A | 4/1992 | Dzung et al. |
| 5,933,812 A * | 8/1999 | Meyer et al. ..................... 705/15 |
| 2004/0104268 A1 | 6/2004 | Bailey |

(Continued)

FOREIGN PATENT DOCUMENTS

| EP | 0599244 A2 | 6/1994 |
| EP | 1732291 A1 | 12/2006 |

OTHER PUBLICATIONS

International Search Report dated Mar. 13, 2012 for corresponding International Application No. PCT/EP2011/072003, filed Dec. 7, 2011.

(Continued)

*Primary Examiner* — Forrest M Phillips
(74) *Attorney, Agent, or Firm* — David D. Brush; Westman, Champlin & Koehler, P.A.

(57) ABSTRACT

A power supply base for a payment terminal is provided with a housing having an opening for receiving a memory card. The power supply base includes a guide for guiding the payment terminal towards a position wherein it can receive the power supply, the guide including at least one guiding part shaped in such a way as to enable the insertion thereof into the opening of the payment terminal.

5 Claims, 5 Drawing Sheets

(56) References Cited

U.S. PATENT DOCUMENTS

| | | |
|---|---|---|
| 2005/0236480 A1 | 10/2005 | Vrotsos et al. |
| 2006/0049255 A1 | 3/2006 | von Mueller et al. |
| 2006/0178967 A1 | 8/2006 | Jung et al. |
| 2006/0279251 A1 | 12/2006 | Guyot et al. |
| 2007/0047198 A1* | 3/2007 | Crooijmans et al. .......... 361/686 |
| 2009/0174998 A1* | 7/2009 | Struthers et al. ......... 361/679.41 |
| 2009/0231801 A1* | 9/2009 | Cummins ................ 361/679.41 |
| 2010/0067190 A1* | 3/2010 | Yu .......................... 361/679.41 |

OTHER PUBLICATIONS

French Search Report dated Oct. 11, 2011 for corresponding French Application No. FR 1060206, filed Dec. 7, 2010.
International Preliminary Report on Patentability and English translation of the Written Opinion dated Jun. 12, 2013 for corresponding International Application No. PCT/EP2011/072003, filed Dec. 7, 2011.
French Search Report dated Jun. 22, 2011 for corresponding French Application No. FR 1060204, filed Dec. 7, 2010.

* cited by examiner

POWER SUPPLY BASE FOR ELECTRONIC PAYMENT TERMINAL AND ELECTRONIC PAYMENT TERMINAL

CROSS-REFERENCE TO RELATED APPLICATIONS

This Application is a Section 371 National Stage Application of International Application No. PCT/EP2011/072003, filed Dec. 7, 2011, which is incorporated by reference in its entirety and published as WO 2012/076569 on Jun. 14, 2012, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE INVENTION

The present invention pertains to the field of electronic payment terminals. More particularly, the present invention pertains to a power supply base for an electronic payment terminal.

PRIOR ART

At present, payment terminals are used very widely to enable payment for purchases of goods and services at sales points. These terminals generally include a smartcard reader and a magnetic card reader. They also have a screen used in particular to view the amounts involved in the transactions and a keypad for entering these amounts as well as confidential codes, entered by the customers, or else they have a touch-sensitive screen.

These payment terminals generally have a battery, enabling them to work autonomously. This battery must be recharged regularly, classically by means of a power supply base, also called a power supply cradle, on which the payment terminal is placed so that the power supply means for the terminal come into contact with the power supply means of the base.

Classically, a power supply base of this kind has means for guiding the payment terminal towards a power supply position in the form of uprights along which the terminal must slide or in the form of metal rods that get inserted into locations of the terminal provided for this purpose.

One drawback of these different guiding means lies in their bulky shape and/or their lack of guiding precision.

Thus, there is a need to propose a novel power supply base for electronic payment terminals that is compact in shape and requires little space while at the same time showing optimal precision in guiding the electronic payment terminal towards a power supply position.

SUMMARY OF THE INVENTION

The invention therefore proposes a novel solution that does not have all these prior-art drawbacks in the form of a power supply base for an electronic payment terminal, the case of which has an aperture designed to receive a memory card.

According to the invention, such a base has means for guiding said payment terminal to a power supply position of said payment terminal, said means for guiding comprising at least one guiding portion, the shape of which can enable its insertion into said aperture of said payment terminal.

Thus, the terminal is guided on the base up to a power supply position through guiding means which get inserted into the terminal itself, unlike the prior-art guiding means which provide for receiving the terminal by surrounding it, for example by means of uprights along which the terminal must slide.

In this way, according to this embodiment of the invention, the guiding of the payment terminal is precise, also providing for its stability in the power supply position.

Besides, this same location is used for reading a memory card and for electrical charging, thus optimizing the manufacture of the device and limiting the number of apertures in its case.

According to one particular embodiment of the invention, it is provided that the guiding means will get inserted into means for receiving a smartcard of the payment terminal, for example a smartcard reader, the input of which is situated in the lower edge of the payment terminal in the position of use.

According to one particular characteristic of the invention, the means for guiding the base are formed by a protrusion of material extending from the power supply base having a shape similar to that of a memory card.

Thus, the means for guiding are formed with the base, without the addition of elements after the manufacture of the base, thus providing a uniformity of the structure of the power supply base.

For example, the protrusion has the shape, i.e. the thickness and/or the width and/or the height, of a memory card.

The means for guiding can for example have a thickness identical to that of a memory card but lesser width and height so as to offer greater compactness to the power supply base.

According to another embodiment of the invention, said means for guiding comprise power supply means placed so as to cooperate with contacts of said payment terminal that are not flush, in said power supply position.

Thus, according to this embodiment of the invention, the means for guiding also make it possible to carry out the function of supplying power to the payment terminal.

For example, the power supply means of the base are formed by at least one metal part positioned on each side of the guiding means, each metal part cooperating with a contact of the payment terminal.

According to another aspect of the invention, the power supply means of the base form means for discharging static electricity from the payment terminal, thus enabling compliance with the security constraints on the discharging of static electricity.

The invention also pertains to a payment terminal comprising means for connection to an electrical power supply positioned inside the case of said terminal in a way that is not flush.

Thus, according to this embodiment, the means of connection to a power supply are secured from a viewpoint of static electricity. Indeed, when the payment terminal is taken, it is not possible to come into contact with the means of connection with a power supply, since these connection means are inside the payment terminal.

According to one particular characteristic of the invention, said means of connection to a power supply are positioned on either side of an aperture of the case of the terminal designed to receive a memory card.

In this way, these means of connection to a power supply are capable of cooperating with the power supply means of a power supply base according to one embodiment of the invention described here above, wherein the power supply means of the base are formed by at least one metal part positioned on each side of the guiding means, which are themselves laid out so as to get inserted into means for receiving a memory card of the payment terminal.

According to one particular embodiment of the invention, the means for supplying power to the payment terminal are positioned on each side of the input of the means for receiving a smartcard of the payment terminal, for example on each side of the input of the smartcard reader.

According to one particular characteristic of the invention, said means of connection to a power supply are placed so as to be sufficiently distant from the exterior and from the edge of said aperture so as to be out of reach of a user of said payment terminal in the normal mode of use, so as to ensure said user's safety with respect to a static electricity of said terminal.

It is thus possible to place electrical contacts inside the casing of the terminal in a manner such that they are sufficiently distant from the exterior and from the edge of the device, thus securing the power supply and limiting problems due to static electricity.

According to another aspect of the invention, the means of connection to a power supply of the payment terminal form means for discharging static electricity from the payment terminal, cooperating with the power supply means of the power supply base according to the invention.

LIST OF FIGURES

Other features and advantages of the invention shall appear more clearly from the following description of a particular embodiment given by way of a simple illustratory and non-exhaustive example and from the appended figures, of which.

DESCRIPTION OF ONE EMBODIMENT OF THE INVENTION

1. General Principle

The general principle of the invention relies on a power supply base using means for receiving a memory card in an aperture of a case of an electronic payment terminal, thus making it possible to guide the electronic payment terminal with precision towards a power supply position while at the same time offering a compact shape of a power supply base.

Figure 2:
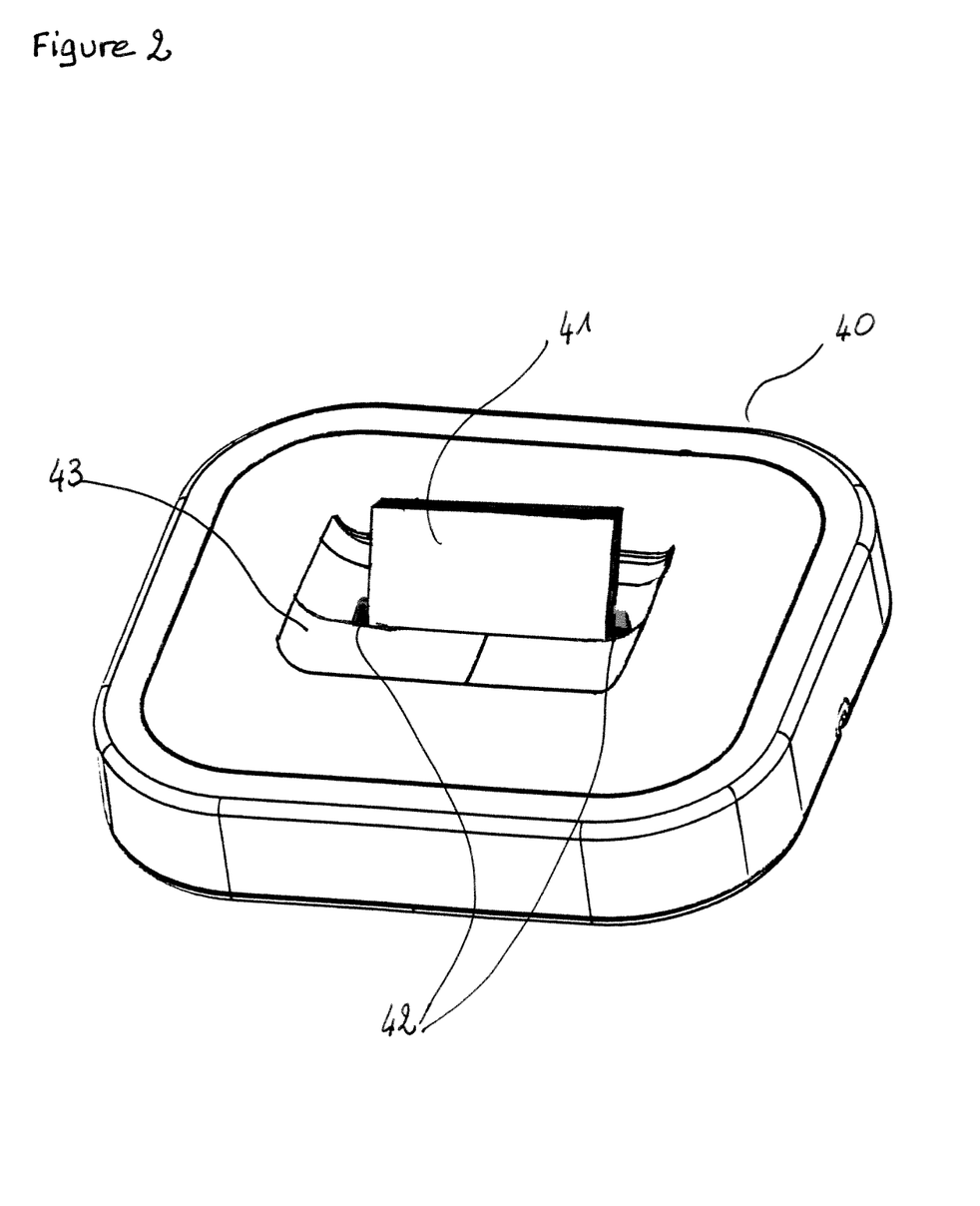
FIG. 2 illustrates an example of a power supply base for a payment terminal as illustrated in FIGS. 1A to 1D, according to one embodiment of the invention.

Referring now to FIG. 2, an example is presented of a power supply base for such a payment terminal according to one embodiment of the invention.

The power supply base (40) of the payment terminal comprises, according to this embodiment of the invention, a guide (guiding means) (41) for guiding the payment terminal towards a power supply position of said payment terminal.

As illustrated in FIG. 2, the guiding means are laid out so as to get inserted into or to penetrate means for receiving a memory card, for example a smartcard, provided in an aperture of the case of the payment terminal, because of their specific shape which is similar to that of a memory card.

These means for guiding are positioned in a concave part, in this case a hollow (43) formed in the power supply base, thus enabling the terminal to reach a powering position when it is housed in the hollow of the base, a position in which it is kept in a stable manner through the cooperation of the hollow and of the guiding means.

Furthermore, efficient use is made of the means for receiving a memory card. Indeed, the same means make it possible firstly, in a classic way, to insert a memory card and secondly, according to the invention, to electrically charge the device without its being necessary to provide for a specific female connector on this device. The electrical contacts enabling the charging are placed so as not to interfere with the use of the memory card, and for example on the sides of the means for receiving.

Besides, in this embodiment of the invention, the means for guiding (41) comprise a power supply (power supply means) (42), laid out to cooperate in a power supply position with contacts of the payment terminal enabling connection to a power supply.

For example, the power supply means are metal parts positioned on either side of the guiding means (41) as illustrated in FIG. 2.

Thus, when the terminal is in the power supply position, i.e. when the guiding means (41) are inserted into means for receiving a smartcard of the terminal and when the terminal is housed in the hollow (43) of the base, the power supply means on the base cooperate with contacts of the terminal, thus carrying out the charging of the battery of the terminal.

Figure 3:
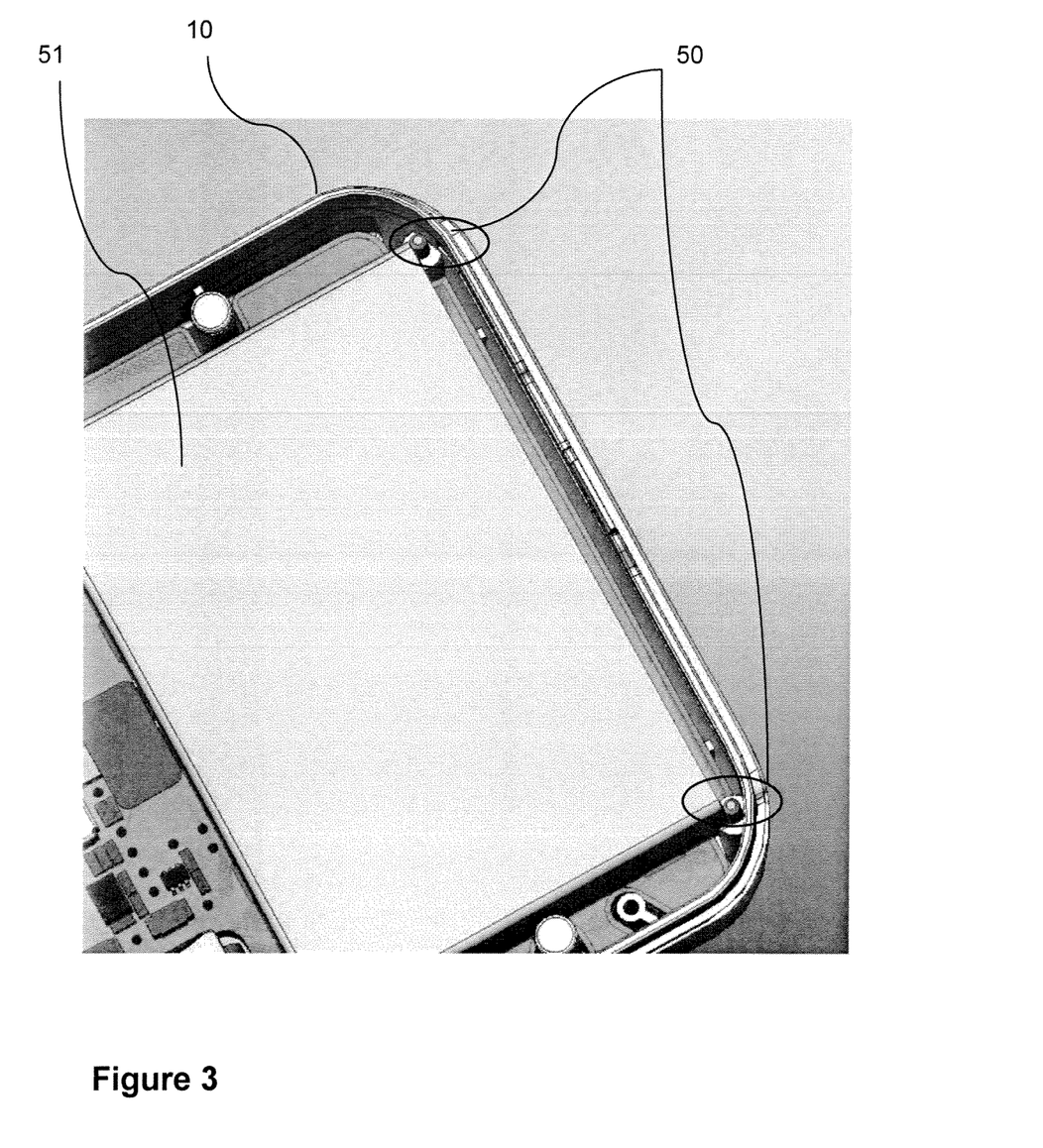
FIG. 3 describes an example of means for powering a payment terminal as illustrated in FIGS. 1A to 1D according to one embodiment of the invention.

These internal contacts (50) of the payment terminal are illustrated in FIG. 3.

In this embodiment, the contacts (50) are positioned on either side of the input of the smartcard reader (51) of the terminal, thus enabling a power supply to the terminal when it is in power supply position on the base. Indeed, with the guiding means (41) of the base being inserted into the card reader (51) of the terminal, the terminal resting on the hollow (43) of the base, the power supply means (42) of the base cooperate with the contacts (50) of the terminal. These contacts are furthermore used to discharge the static electricity of the terminal.

It must be noted that the positioning of the contacts (50) of the payment terminal within this terminal and not, as is done classically in the prior art, flush with the exterior of the terminal, provide for efficient security in terms of static electricity, the contacts being out of reach of the user of the payment terminal in the normal mode of use. The constraints in terms of electrostatic discharge (ESD) are therefore less strict because of the non-flush positioning of these contacts. Furthermore, these contacts are not visible or easily accessible from the exterior, thus avoiding a wrongful manipulation or fraudulent manipulation.

2. Particular Embodiment

A description is now provided of a particular embodiment of the invention based on a novel type of electronic payment terminal relying on the physical pairing of a payment device to a communications terminal such as a "smartphone" to form a payment terminal.

This novel type of terminal is aimed at mitigating the drawbacks of the prior art and especially makes it possible to avoid having recourse to a dedicated telephone line in order to set up a connection with the communications network and with servers such as authorization servers or bank servers.

Indeed, the most recent terminals are connected to cash registers and/or to computers by means of communications networks. Such connections can be cable connections, for example of the Ethernet or wireless type. These connections are used for example to link up to an authentication server or to a bank server in order to obtain an authorization of debit.

In order to be able to communicate with the exterior and especially with bank servers, the terminal payments therefore use connection means. One of these means consists of the use of a wireless communications network, for example GPRS (General Packet Radio Service) network. The payment terminal is then provided with a SIM (Subscriber Identity Module) card. This is a chip containing a microcontroller and memory. This SIM card is associated with a telephone subscription (of the data transmission type) which must be paid by the merchant.

Apart from the fact that this type of subscription is relatively costly, the performance of communications functions is assigned to the payment terminal. Thus, in addition to the payment functions, the terminal must manage communications functions, which are not naturally the functions, expected of a payment terminal.

To mitigate the problem of subscription costs associated with the GPRS communication in particular, novel types of payment terminals communicate by means of a WiFi (Wireless Fidelity) type of network for example. The merchant then is no longer obliged to take out a particular subscription. The payment terminal can link up to the merchant's WiFi network and access the bank servers in the same way as in a wire connection. However, the use of the payment terminal is then limited to the coverage zone of the WiFi network, which is not suited to nomadic use (for example for a doctor visiting his patients).

Thus there is a need to propose a payment terminal that can be used by nomadic merchants, hence through the use of a GPRS/UMTS type wireless communications network and, at the same time, to reduce to the minimum the costs of using such a payment terminal.

The electronic payment terminal according to this embodiment of the invention does not have these drawbacks of the prior art.

The invention according to this embodiment pertains more particularly to a payment terminal that takes the form of a device called a "payment" device, which is physically paired with a communications terminal.

More particularly, the communications terminal with which the payment device is paired is a mobile telephone commonly called a "smartphone", i.e. a mobile phone also having the functions of a personal digital assistant (PDA).

Thus, the invention makes it possible to overcome the drawbacks of the prior art and especially makes it possible to avoid having recourse to a dedicated telephone line in order to set up a connection with the communications network and with servers such as authorization servers or bank servers.

Besides, because of the pairing of these two devices, the thickness of which especially is not identical, the payment terminal according to the invention has an asymmetrical structure and therefore a particular positioning of its power supply means.

The power supply base according to the invention makes it possible to take account of the particular asymmetrical structure of the payment terminal according to the invention.

More particularly, in this embodiment of the invention, the payment device is physically paired with the communications terminal by means of a particular pairing structure, called a modular interface. When used, this modular interface is attached to a rear face of a payment device. This structure can be dismantled according to one particular embodiment of the invention, in implementing a particular mode of kinematic functioning.

This modular interface according to the invention enables the insertion and retaining of the communications terminal in a housing provided for this purpose. Among the elements of this modular interface, according to the invention, it is possible to distinguish especially a pairing device, also called an electronic connection card, enabling a physical connection to be set up between the payment device and the communications terminal.

This modular interface comprises other elements, which, according to the invention, provide for security of use of the payment terminal formed by the payment device and the communications terminal.

More particularly, the payment terminal that is the object of the invention is described with reference to FIGS. 1A to 1D.

The payment terminal (10) comprises two general components constituted by the payment device (20) and the communications terminal (30).

Figure 1A:
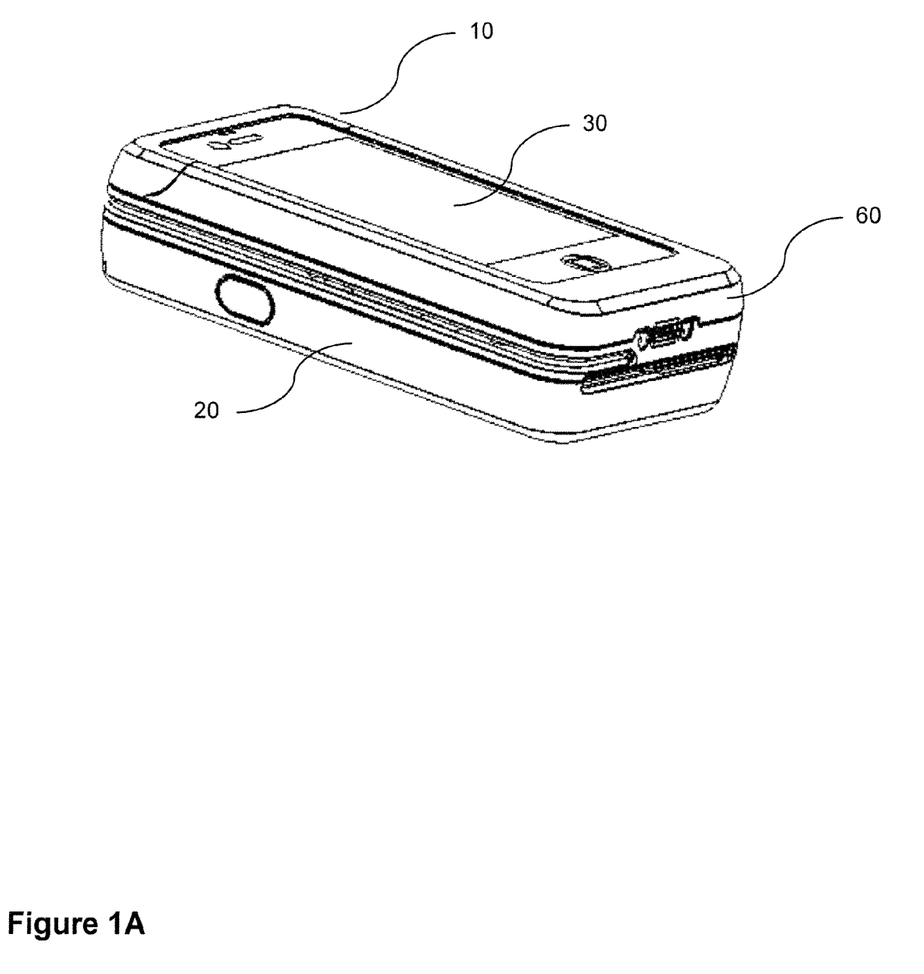
FIGS. 1A to 1D illustrate an example of a payment terminal according to one embodiment of the invention.
Figure 1B:
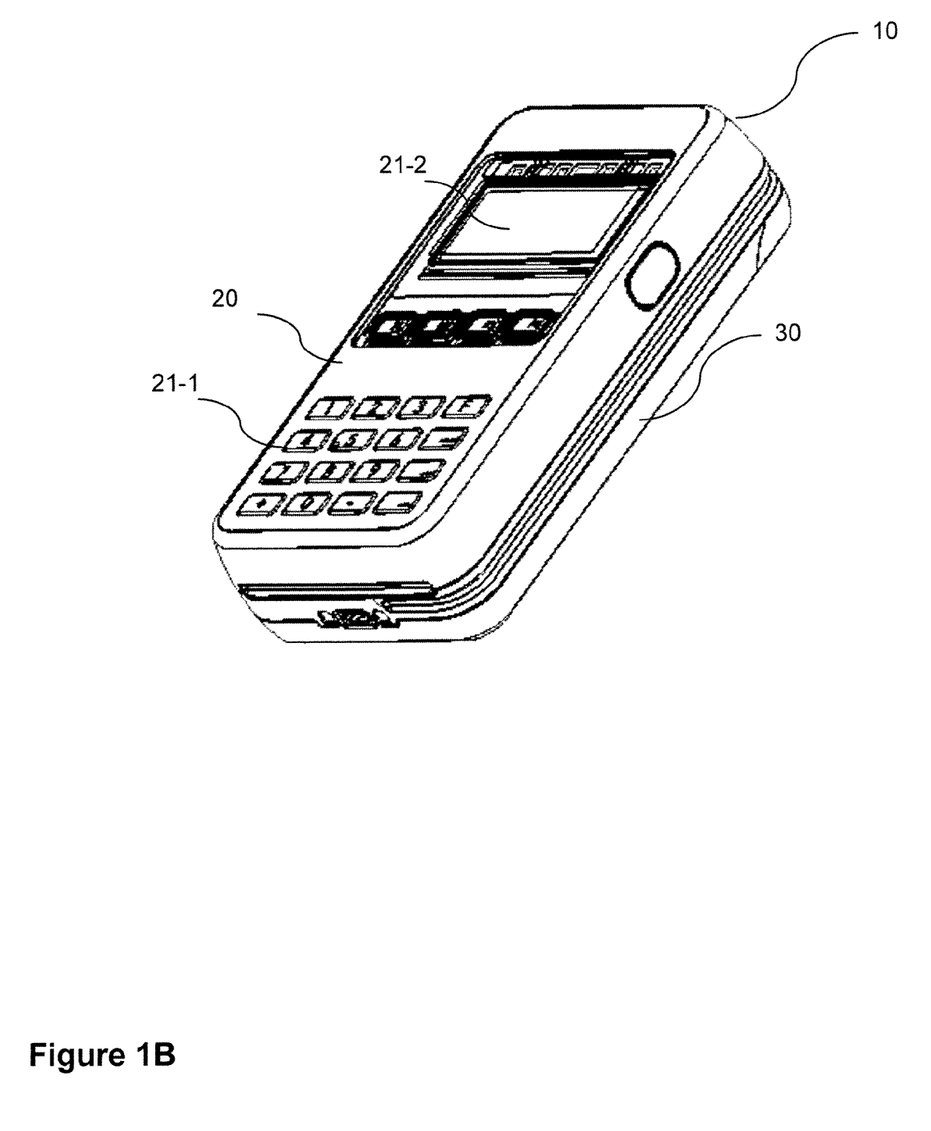
Figure 1C:
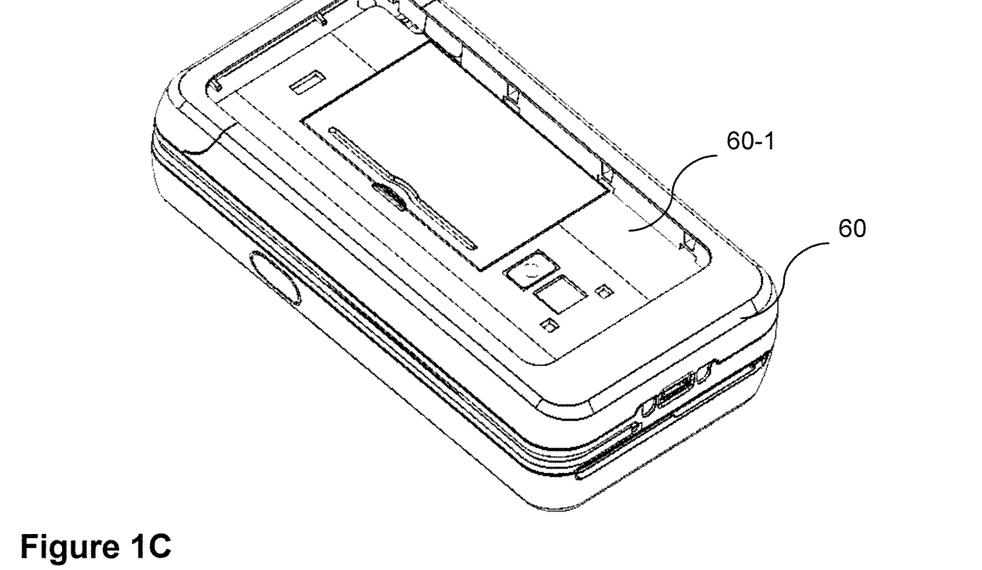

As illustrated in an illustrative and non-exhaustive embodiment of the invention, the payment device (20) comprises a front face, which can be seen in FIG. 1B, having a keypad for keying in information (21-1), a screen for viewing (21-2) the information keyed in. The payment device comprises, on the rear face, which can be seen in FIG. 1D, a surface (22) enabling the attachment of a modular interface (60) for the pairing of the communications terminal (30).

Figure 1D:
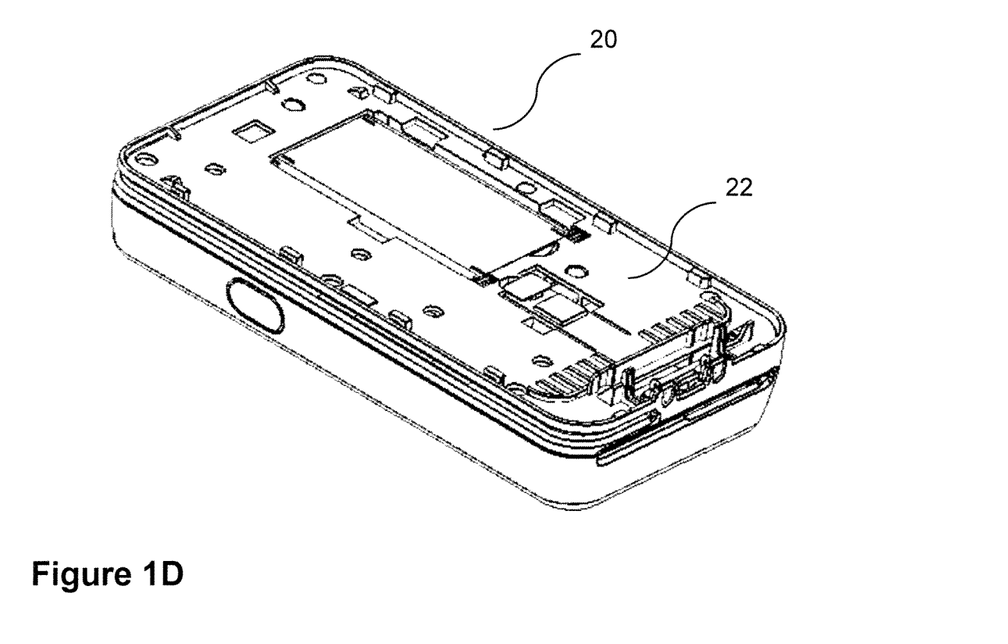

More particularly, this modular interface defines a housing (60-1) for the insertion and pairing of the communications terminal (30).

FIG. 2, already described here above, presents an example of a power supply base for such a payment terminal according to one embodiment of the invention.

All the characteristics of the invention described here above with reference to FIG. 2 can also be applied to this embodiment and are not repeated herein.

Besides, this FIG. 2 shows that the guiding means (41) are not positioned symmetrically in the hollow (43), thus making it possible to take account of the specific asymmetric structure of the payment terminal according to the invention.

Thus, the means for guiding also serve as a coding system for the user of the terminal and enable him to position the payment terminal accurately on the base so as to ensure the efficient functioning of the power supply.

FIG. 3, also described here above, illustrates an example of contacts for the power supply of a payment terminal of this kind comprising a pairing of two devices.

Although the present disclosure has been described with reference to one or more examples, workers skilled in the art will recognize that changes may be made in form and detail without departing from the scope of the disclosure and/or the appended claims.

The invention claimed is:

1. A power supply base for a payment terminal having a case which has a smart card aperture designed to receive a smart card, said power supply base comprising:

A guide configured to guide said payment terminal to a power supply position of said payment terminal, said guide comprising at least one guiding portion, the shape of which enables insertion of the at least one guiding portion into said smart card aperture of said payment terminal, and comprising a protrusion from said power supply base having a shape similar to that of a smart card.

2. A power supply base according to claim 1, wherein said guide comprises a power supply placed so as to cooperate with contacts of said payment terminal, which are not flush with an exterior of said payment terminal, in said power supply position.

3. A power supply base according to claim 2, wherein said power supply comprises at least one metal part positioned on each side of said guide, each metal part cooperating with a respective one of the contacts of said payment terminal.

4. A payment terminal comprising:
a case; and
contacts for connection to an electrical power supply positioned inside the case of said terminal in a way that is not flush with an exterior of said terminal, said contacts for connection to a power supply being placed on either side of a memory card aperture of the case of the terminal, and wherein the memory card aperture is configured to receive a memory card.

5. The payment terminal according to claim 4, wherein the contacts for connection to a power supply are placed so as to be sufficiently distant from the exterior and from an edge of said aperture so as to be out of reach of a user of said payment terminal in normal mode of use, so as to ensure said user's safety with respect to a static electricity of said terminal.

\* \* \* \* \*